United States Patent [19]
Benoist et al.

[11] Patent Number: 5,392,455
[45] Date of Patent: Feb. 21, 1995

[54] TRANSDUCER WITH INTEGRATED SWITCH ELEMENT

[75] Inventors: William B. Benoist, Lake Worth; Philip Kitching, N. Lauderdale; Martin D. McCluskie, Pompano Beach, all of Fla.

[73] Assignee: Motorola, Inc., Schaumburg, Ill.

[21] Appl. No.: 976,820

[22] Filed: Nov. 16, 1992

[51] Int. Cl.$^6$ .............................................. H04B 1/08
[52] U.S. Cl. ................... 455/382; 455/38.4; 455/350; 455/351; 381/188; 381/205
[58] Field of Search ............... 455/38.2, 38.4, 344, 455/347, 350, 351; 340/825.44; 381/188, 205

[56] References Cited

U.S. PATENT DOCUMENTS

| | | | |
|---|---|---|---|
| 4,768,031 | 8/1988 | Mori et al. | 455/38.4 |
| 5,077,829 | 12/1991 | Tsunoda et al. | 455/38.2 |
| 5,257,413 | 10/1993 | Warner et al. | 455/350 |

OTHER PUBLICATIONS

Motorola technical publication, entitled "Bravo Series Numeric Display Pagers", published by Motorola, Inc., of Boynton Beach, Florida. Mar. 1987.

*Primary Examiner*—Edward F. Urban
*Assistant Examiner*—Andrew Faile
*Attorney, Agent, or Firm*—Kelly A. Gardner; John H. Moore

[57] ABSTRACT

A data communication receiver (100) for receiving a radio frequency (RF) signal includes receiving circuitry (410) for receiving the RF signal and recovering a selective call message therefrom and for generating an activation signal in response to recovery of the selective call message. The data communication receiver (100) further includes a transducer/switch component (300) coupled to the receiving circuitry (410) comprising a transducer (230) having leads (305, 310) formed thereon for providing the activation signal to drive the transducer (230), wherein a first of the leads (310) has contiguously formed therefrom a switch element (105) for selectively contacting the receiving circuitry (410).

13 Claims, 4 Drawing Sheets

TRANSDUCER WITH INTEGRATED SWITCH ELEMENT

FIELD OF THE INVENTION

This invention relates in general to annunciation devices, and more specifically to a transducer having an integrated switch element.

BACKGROUND OF THE INVENTION

With the advances in technology in recent years, many complex electronic devices have been designed and produced for mass consumption by the public. These electronic devices often utilize hundreds of components, some of which may be very expensive. The cost of these components is, of course, reflected in the final cost of the product. Additionally, each component in an electronic device is typically ordered, stocked, and assembled separately. Therefore, as the number of components utilized by an electronic device increases, the possibility of errors occurring during the manufacturing process also increases. These manufacturing errors may, in some situations, be corrected by repair of an incorrectly manufactured device, or, if repair is not feasible, by discarding the incorrectly manufactured device. In either case, however, the repair cost, i.e., component cost and cost of time spent repairing the device, and the cost incurred when a device is discarded are reflected in an even greater product cost.

Furthermore, the use of large numbers of components within an electronic device typically increases the size of the device. In some smaller electronic devices, such as pagers which are intended for portable use, this is usually very undesirable from a user standpoint. As a result, desirable but unnecessary features may sometimes be omitted from a pager to ensure that space is available for necessary components. Some of these necessary components are, for example, switches, e.g., on/off switch, reset switch, etc., and an annunciation device, such as a transducer for announcing message reception, both of which are relatively large compared to other components included within a pager. As a result, these components consume large amounts of space that is already at a premium in conventional pagers.

Thus, what is needed is a method for combining the functions of two or more larger pager components into a single device, thereby reducing the number of parts included within the pager and creating additional space for other pager components.

SUMMARY OF THE INVENTION

A transducer/switch component for generating an audible alert and for providing user activation of one or more functions includes a transducer having leads formed thereon for providing a signal to drive the transducer and thereby generate the audible alert. A first of the leads has contiguously formed therefrom a switch element that is activated by user manipulation to provide the activation of the one or more functions independent of operation of the transducer.

DESCRIPTION OF A PREFERRED EMBODIMENT

Figure 1:
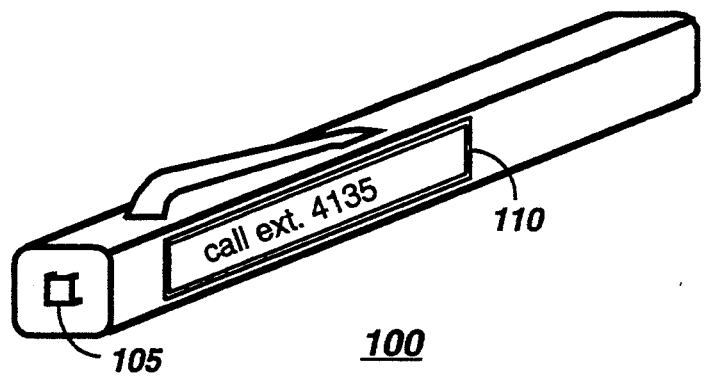
FIG. 1 is a perspective view of a data communication receiver in accordance with a preferred embodiment of the present invention.

FIG. 1 is a perspective view of a data communication receiver 100 in accordance with a preferred embodiment of the present invention. As shown, the data communication receiver 100 is manufactured in a "pen" form factor that may be conveniently clipped to a belt or pocket and easily carried by a user. It may be appreciated, however, that the data communication receiver 100 may be manufactured in numerous other form factors, e.g., watch, credit card, etc. Upon reception of a selective call message, a transducer (not shown) included within the data communication receiver 100 generates an audible alert to announce reception of the message. Thereafter, the user may depress an actuator 105 to silence the alert. Preferably, depression of the actuator 105 further results in the presentation of the message on a display device 110, such as a liquid crystal display.

Figure 2:
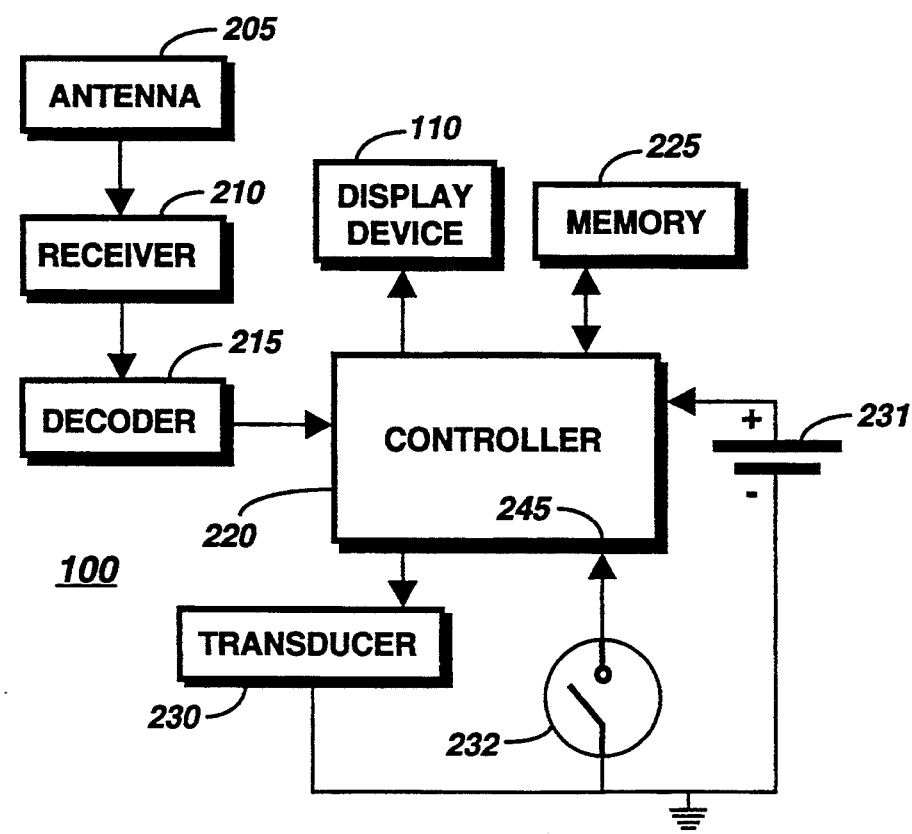
FIG. 2 is an electrical block diagram of the data communication receiver of FIG. 1 in accordance with the preferred embodiment of the present invention.

FIG. 2 is an electrical block diagram of the data communication receiver 100, which comprises an antenna 205 for receiving a radio frequency (RF) signal and a receiver 210 coupled to the antenna 205 for demodulating the RF signal. A decoder 215 coupled to the receiver 210 then recovers a selective call message and an address from the demodulated signal and provides the recovered message and address to a controller 220, such as a Motorola MC68HC05C8 microcomputer, for controlling the operation of the data communication receiver 100. The controller 220 thereafter compares the recovered address to addresses stored in a memory 225. If the recovered address is equivalent to one of the stored addresses, indicating that the selective call message is intended for reception by the data communication receiver 100, the message is stored in the memory 225.

Subsequently, the controller 220 provides an activation signal to a transducer 230, which is coupled between the controller 220 and a negative supply voltage, i.e., "ground", supplied by a battery 231 for powering the data communication receiver 100. In response to reception of the activation signal, the transducer 230 generates an audible alert to announce reception of the message to a user. The user silences the transducer 230 by depressing the actuator 105 (FIG. 1), thereby activating a reset switch 232. Preferably, the switch 232 is a momentary contact switch coupled between the controller 220 and the same electrical ground node to which the transducer 230 is coupled. Furthermore, according to the present invention, the switch 232 is integrally formed from a ground lead of the transducer 230, as will be explained in greater detail below.

When the actuator 105 is depressed by the user, the switch 232 couples a "reset" port 245 of the controller 220 to ground. In response to the momentary grounding of the reset port 245, the controller 220 provides a deactivation signal to silence the transducer 230. Additionally, in response to the depression of the actuator 105, which results in the activation of the switch 232, the controller 220 preferably retrieves the message from the memory 225 and provides the message to the display device 110, subsequent to which the message is presented to the user. It may be appreciated by one skilled in the art, however, that, in alternate embodiments of the present invention, a single depression of the actuator 105 does not necessarily result in presentation of the message and silencing of the transducer 230. For example, a first depression of the actuator 105 may silence the alert, and a second depression of the actuator 105 may result in presentation of the message. Alternatively, depression of the actuator 105 could result in the performance of other functions, such as presentation of time or previously stored messages, by the data communication receiver 100.

Figure 3:
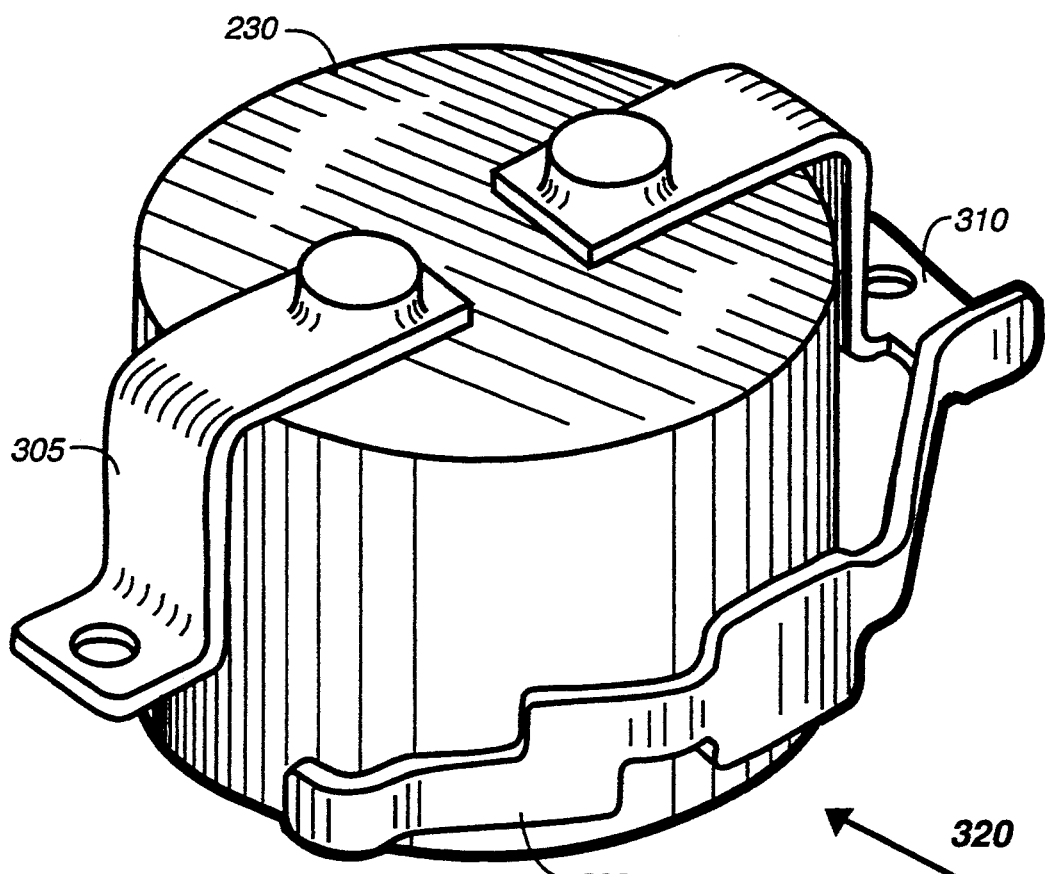
FIG. 3 is a perspective view of a transducer/switch component included within the data communication receiver of FIG. 1 in accordance with the preferred embodiment of the present invention.

In accordance with the preferred embodiment of the present invention, the switch 232 and the transducer 230 are integrally formed to result in a single part, i.e., a transducer/switch component 300, as shown in FIG. 3. FIG. 3 is a perspective view of the transducer/switch component 300, which, as described above, comprises the transducer 230 and the switch 232. The transducer 230 includes a conductive positive lead 305 which is electrically coupled to the controller 220 (FIG. 2) for providing activation and deactivation signals to the transducer 230 and a conductive negative lead 310 which is electrically coupled to a negative supply voltage, such as ground. The switch 232 is contiguously formed from the negative lead 310 and, according to the present invention, is spring loaded. Therefore, the application of a force, such as the force provided by depression of the actuator 105 (FIG. 1), to the switch 232 in a direction 320 deflects the switch 232 in the direction 320 during application of the force. Preferably, the positive lead 305 and the switch 232, including the negative lead 310, are formed from stainless steel selectively plated with nickel.

Because the switch 232 is formed as a part of the transducer 230, a single component, i.e., the transducer/switch 300, is able to perform two distinct functions. Therefore, the number of components utilized in the data communication receiver 100 is reduced, thus allowing a reduction in the size of the data communication receiver 100. Furthermore, because the transducer/switch component 300 replaces two separate parts, the number of possible manufacturing errors, such as ordering, stocking, and assembly errors, is decreased, resulting in a decrease in the final cost of the data communication receiver 100.

Figure 4:
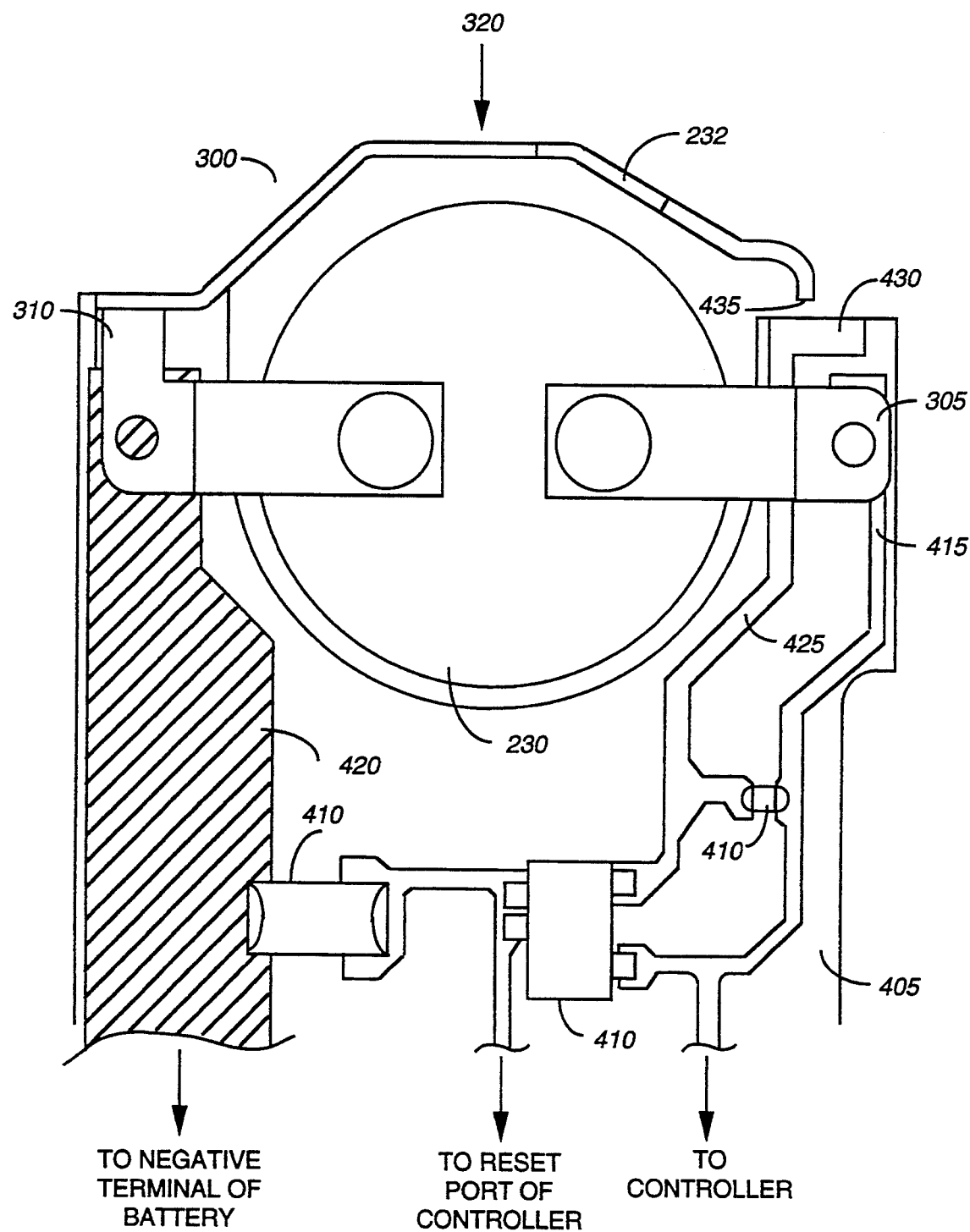
FIG. 4 is a top view of the transducer/switch component of FIG. 3 mounted on a printed circuit board in accordance with the preferred embodiment of the present invention.

Referring next to FIG. 4, the transducer/switch component 300 is mounted on a printed circuit board 405, on which is formed a printed circuit pattern for electrically coupling various components 410 of the circuitry included within the data communication receiver 100. The positive lead 305 of the transducer 230, which is appropriately plated with tin, is preferably soldered to an exposed pad, which is coupled by a runner 415 to the controller 220 (FIG. 2). In this manner, the activation and deactivation signals are transmitted from the controller 220 to the transducer 230 through the runner 415. The negative lead 310 of the transducer 230, also plated with tin, is soldered to ground, which is preferably provided by a ground plane 420 formed on the printed circuit board 405. According to the present invention, the printed circuit pattern further comprises a runner 425 coupled to the reset port 245 (FIG. 2) of the controller 220. The runner 425 terminates in an exposed pad 430 at an edge of the printed circuit board 405 aligned with a contact surface 435 of the switch 232, as may be better understood by referring to FIG. 5.

Figure 5:
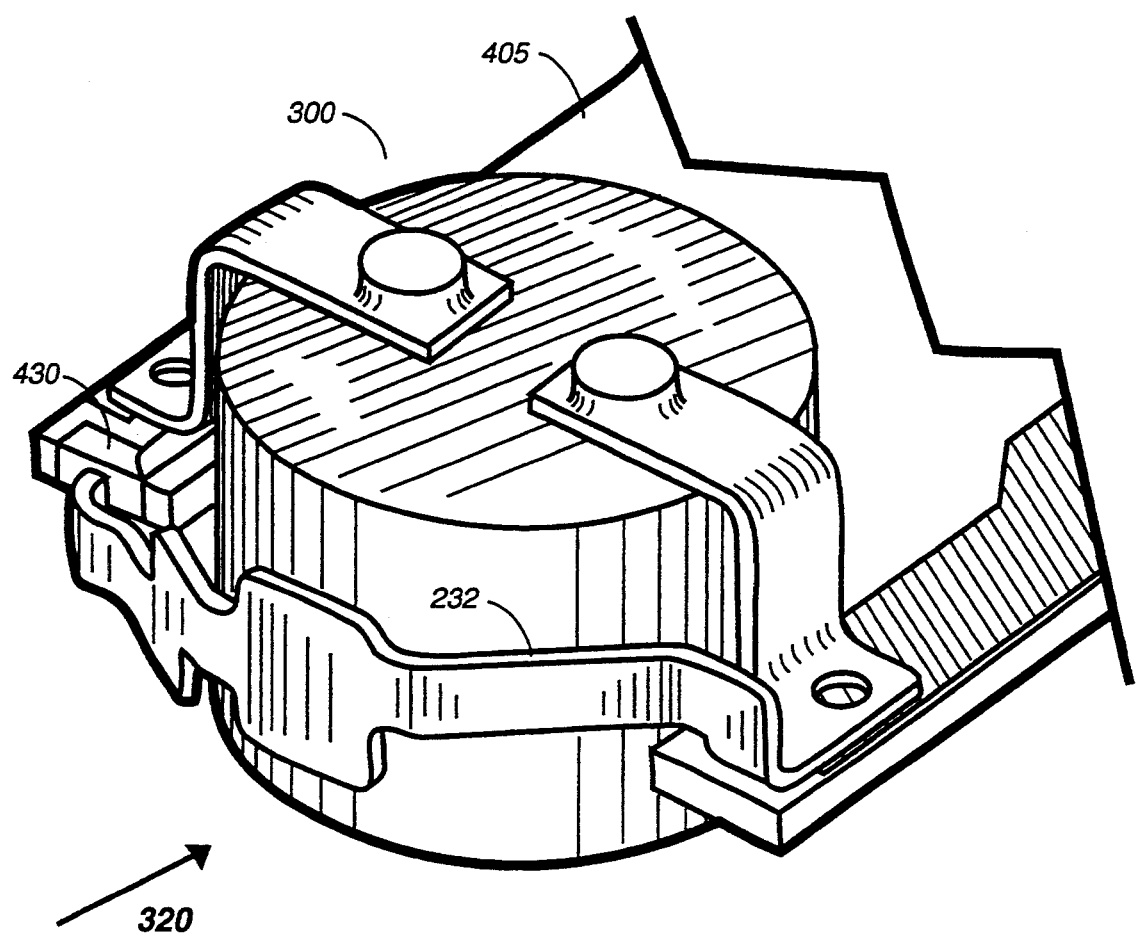
FIG. 5 is a perspective view of the transducer/switch component of FIG. 3 mounted on the printed circuit board of FIG. 4 in accordance with the preferred embodiment of the present invention.

FIG. 5 is a perspective view of the transducer/switch component 300 mounted on the printed circuit board 405. As shown, the exposed pad 430 extends along the edge of the printed circuit board 405 and is aligned with the contact surface 435 (FIG. 4) of the switch 232. Therefore, when a force is applied in the direction 320, i.e., when the actuator 105 is depressed, the switch 232 is deflected in the direction 320, and the contact surface 435 contacts the exposed pad 430, thereby coupling the reset port 245 to ground through the switch 232 and the runner 425 (FIG. 4). Preferably, the contact surface 435 is plated with gold to ensure adequate conductivity. When the force is removed, the switch 232, which is spring loaded, springs back into its original position and contact between the exposed pad 430 and the contact surface 435 is broken. Therefore, the switch 232 is referred to as a momentary contact switch, and, as such, it may, in alternate embodiments, be utilized to momentarily couple any two electrical signals within the data communication receiver 100.

In summary, the transducer/switch component in accordance with the preferred embodiment of the present invention integrates a transducer and a momentary contact switch into a single component. Therefore, fewer parts are needed to manufacture a data communication receiver, which commonly utilizes both a transducer and a momentary contact switch. As a result, the cost of the components included within the data communication receiver decreases. Furthermore, because the transducer and the switch are now integrated into a single component, the number of possible manufacturing errors, such as stocking, ordering, and assembly errors, decreases, resulting in a lower manufacturing cost for the data communication receiver. This lower manufacturing cost is typically reflected in a lower consumer cost. A further advantage of the present invention is the possible reduction of size in a data communication receiver utilizing the transducer/switch component, which occupies less space than that needed for both a conventional transducer and conventional switch.

It may be appreciated by now that there has been provided a single component for performing the functions of both a transducer and a momentary contact switch, thus reducing the number of parts included within an electronic device that utilizes both a transducer and a momentary contact switch.

We claim:

1. A transducer/switch component for generating an audible alert and for providing user activation of one or more functions, the transducer/switch component comprising:

a transducer having leads formed thereon for providing a signal to drive the transducer and thereby generate the audible alert, wherein a first of the leads has contiguously formed therefrom a switch element that is activated by user manipulation to provide the activation of the one or more functions independent of operation of the transducer.

2. The transducer/switch component in accordance with claim 1, wherein the leads are formed from a conductive material.

3. The transducer/switch component in accordance with claim 1, wherein the leads are plated with a conductive material.

4. An electronic device, comprising:
electronic circuitry; and
a transducer/switch component coupled to the electronic circuitry for generating an audible alert and for providing user activation of one or more functions, the transducer/switch element comprising a transducer having leads formed thereon for providing a signal to drive the transducer and thereby generate the audible alert, wherein a first of the leads has contiguously formed therefrom a switch element for selectively contacting, responsive to user manipulations, the electronic circuitry to provide the activation of the one or more functions independent of operation of the transducer.

5. The electronic device in accordance with claim 4, wherein the switch element selectively electrically couples a first terminal of the electronic circuitry to a second terminal of the electronic circuitry.

6. An electronic device, comprising:
electronic circuitry; and
a transducer/switch component coupled to the electronic circuitry for generating an audible alert and for providing user activation of one or more functions, the transducer/switch element comprising a transducer having leads formed thereon for providing a signal to drive the transducer and thereby generate the audible alert, wherein: a first of the leads has contiguously formed therefrom a switch element for selectively contacting the electronic circuitry to provide the activation of the one or more functions;
the first lead electrically contacts the first terminal, and the switch element is electrically coupled to the first terminal through the first lead; and
the switch element is a spring loaded conductor, wherein a force applied to the switch element deflects the switch element into contact with the second terminal, thereby electrically coupling the first terminal to the second terminal when the force is applied to the switch element.

7. The electronic device in accordance with claim 6, wherein the first lead is soldered to the first terminal such that the switch element is electrically coupled to the first terminal.

8. A data communication receiver for receiving a radio frequency (RF) signal, comprising:
receiving circuitry for receiving the RF signal and recovering a selective call message therefrom and for generating an activation signal in response to recovery of the selective call message; and
a transducer/switch component coupled to the receiving circuitry for generating an audible alert and for providing user activation of one or more functions, the transducer/switch element comprising a transducer having leads formed thereon for providing the activation signal to drive the transducer and thereby generate the audible alert, wherein a first of the leads has contiguously formed therefrom a switch element for selectively contacting, responsive to user manipulations, the receiving circuitry to provide the activation of the one or more functions independent of operation of the transducer.

9. The data communication receiver in accordance with claim 8, wherein the switch element selectively electrically couples a first terminal of the receiving circuitry to a second terminal of the receiving circuitry.

10. A data communication receiver for receiving a radio frequency (RF) signal, comprising:
receiving circuitry for receiving the RF signal and recovering a selective call message therefrom and for generating an activation signal in response to recovery of the selective call message; and
a transducer/switch component coupled to the receiving circuitry for generating an audible alert and for providing user activation of one or more functions, the transducer/switch element comprising a transducer having leads formed thereon for providing the activation signal to drive the transducer and thereby generate the audible alert, wherein:
a first of the leads has contiguously formed therefrom a switch element for selectively contacting the receiving circuitry to provide the activation of the one or more functions;
the first lead electrically contacts the first terminal, and the switch element is electrically coupled to the first terminal through the first lead; and
the switch element is a spring loaded conductor, wherein a force applied to the switch element deflects the switch element into contact with the second terminal, thereby electrically coupling the first terminal to the second terminal when the force is applied to the switch element.

11. The data communication receiver in accordance with claim 10, wherein:
the first lead receives from the first terminal a supply voltage; and
the switch element, when the force is applied thereto, provides the supply voltage to the second terminal.

12. The data communication receiver in accordance with claim 10, further comprising a printed circuit board, wherein the receiving circuitry comprises a printed circuit pattern formed on the printed circuit board and components mounted thereon.

13. The data communication receiver in accordance with claim 12, wherein:
the first terminal is a first exposed pad formed by the printed circuit pattern, wherein the first lead is soldered to the first exposed pad;
the second terminal is a second exposed pad formed by the printed circuit pattern; and
the switch element, when the force is applied thereto, contacts the second exposed pad to provide a voltage supplied by the first exposed pad thereto.

* * * * *